Dec. 24, 1957    M. C. SANZ ET AL    2,817,605
METHOD FOR SEALING THE PORES IN A CARBON BODY
Filed March 24, 1947
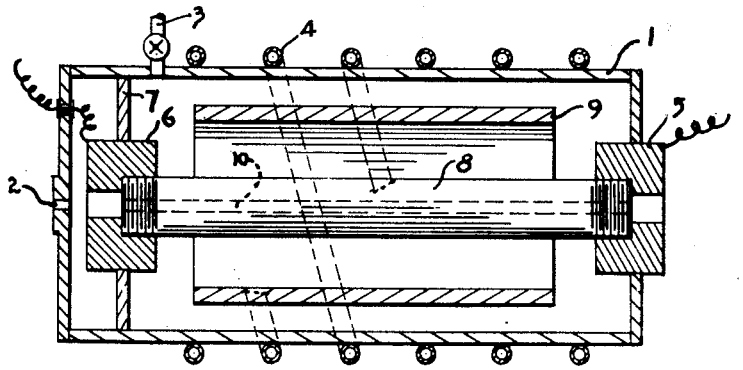
_Fig. 1_
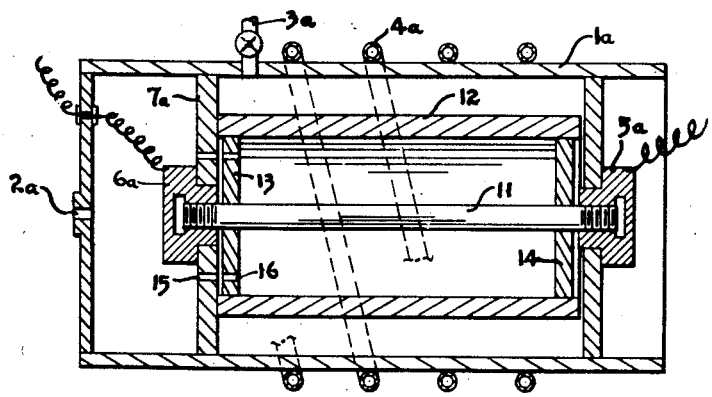
_Fig. 2_
INVENTORS
MANUEL C. SANZ
CARL R. MALMSTROM
JAMES M. NUDING
HUBERT P. YOCKEY
BY
ATTORNEY

United States Patent Office 2,817,605
Patented Dec. 24, 1957

2,817,605
METHOD FOR SEALING THE PORES IN A CARBON BODY

Manuel C. Sanz, Carl R. Malmstrom, and James M. Nuding, Los Angeles, and Hubert P. Yockey, Inglewood, Calif., assignors, by mesne assignments, to the United States of America as represented by the United States Atomic Energy Commission Application March 24, 1947, Serial No. 736,630

2 Claims. (Cl. 117—228)

This invention relates generally to high temperature sealing of porous materials such as carbon or graphite.

More specifically, the invention relates to sealng of porous materials which are used as a support or moderator in conjunction with atomic energy material.

The atomic energy material in one form of the invention may be composed of a support or moderator suitably impregnated or compounded with an active substance. (Active substance is defined as a substance capable of supporting nuclear chain reactions and includes such materials as uranium, plutonium, and the like, as well as compounds of any of these materials.) Where the material serves only to support the active substance, the reactor is known as a fast neutron reactor, and where a support and moderator, the reactor is known as a resonance neutron reactor or a slow neutron reactor.

It is therefore an object of this invention to provide a method whereby porous substances (for example graphite and carbon) may be effectively sealed for high temperature use.

In the use of porous graphite as a moderator it is desirable to have the same impervious to the passage of air or liquids. The porous moderator material may be treated with synthetic resins, in a known manner, to accomplish this result where the graphite is to be used under temperature conditions not exceeding approximately 250° C. However, at higher temperatures the synthetic resins decompose and are ineffective to accomplish the desired purpose.

According to the present invention the porous graphite or carbon matrix is effectively sealed by sublimation of carbon in the pores of the matrix. This result is obtained generally by heating the carbon or graphite in an inert or carburizing atmosphere in such a manner that the carbon vapors travel through the pores of the graphite to be sealed, and deposit in the pores by sublimation to effectively seal the same.

The invention is illustrated in the attached drawings, in which:

Fig. 1 is a cross-sectional view of an arrangement for practicing the invention; and Fig. 2 is a view similar to Fig. 1 in a modified form.

Referring to the drawings, 1 is a casing provided with a gas inlet at 2, a venting arrangement at 3, and cooling coils 4. One end of the casing is provided with an electrode 5, a second electrode 6 being suitably supported by member 7 for sliding engagement inside the casing 1 in response to expansion and contraction of the various parts of the arrangement. Suitably supported in the electrodes is a tubular member 8 which may be formed of carbon, graphite, or the like and which is to be sealed according to the present invention, while a shielding member 9, formed of graphite or other suitable material, may be provided for reducing radiation losses. Tubular member 8 is to be sealed by heating to vaporization, while at the same time controlling the flow of vapor formed thereby, so that the vapor deposits by sublimation on the exterior of the tubing and thence gradually inwardly to effectively seal the same. In carrying out the invention, heat is applied to tube 8 through electrodes 5 and 6, suitably connected to an outside source of power. By heating the tube 8 to approximately 3000° C., carbon vapor is caused to form which will tend to flow from the portion 10 of the tube to the exterior thereof. The shield 9 controls the radiation of heat from the tube 8 within desired limits, while cooling coils 4, through which may be forced a suitable cooling fluid, may be used to control the temperature of the casing. By means of this arrangement, the exterior surface of the porous material 8 may be maintained at approximately 1500° C., a temperature at which sublimation of the carbon vapor satisfactorily takes place. Carbon vapor will flow naturally from the interior 10 of the tube 8 to the exterior thereof for the reason that the interior of the tube will be the hottest part thereof. To avoid formation of unwanted products, such as acetylene, an inert gas, such as helium, may be caused to flow through the interior of the tube during the heating operation. The opening 2 may be used for this purpose. If it is desired to accentuate the sealing operation, a carburizing gas, such as methane, may be used instead of helium. Such a gas provides at least a part of the carbon for sealing the porous material. The gas is introduced through opening 2 to the interior 10 under suitable pressure, it being understood that outflow of the gas will be controlled by suitable valves or other means. It has been found that, in carrying out the invention by use of a carburizing gas, such as methane, it is only necessary to heat the carbon tube to the cracking temperature of the gas. Vent 3 is provided to carry off any excess gaseous products.

It may be noted that electrode 5 is secured to an end of casing 1, while electrode 6 is attached to member 7 slidably received within casing 1. This arrangement permits expansion and contraction of the various parts in the heating arrangement. It is to be understood that coils 4 are suitably connected to a source of cooling fluid which may be pumped or otherwise caused to flow therethrough in a well known manner. The cooling coils, together with the arrangement of electrodes and the shield 9, permit a light weight construction and, in the preferred embodiment of the invention, a steel casing may be used.

In the embodiment of the invention illustrated in Fig. 2 of the drawing a solid rod 11 is adapted to be vaporized so as to seal a tubular member 12 formed of graphite, carbon, or other suitable material. The details of the heating arrangement are similar to that illustrated in Fig. 1 in that electrode 5a is provided in an end of casing 1a. This electrode is suitably connected to the carbon rod 11 which is to be vaporized. At the other end of the carbon rod 11 there is provided an electrode 6a suitably supported in a member 7a which in turn is adapted to slide in casing 1a in response to expansion and contraction of the parts. The casing is provided with a vent 3a, cooling coils 4a, and an opening 2a to provide for an inert or carburizing gas if it is desired to use the same. Tubular member 12 is suitably spaced from the rod 11 by graphite plates 13 and 14. Member 7a is provided with openings 15 aligned with openings 16 in plate 13 to permit passage of the inert or carburizing gas to the interior of member 12. The operation of this form of the invention is similar to that shown and described in Fig. 1 in that rod 11 is heated to vaporization. These vapors will travel through porous member 12 to be deposited on the exterior thereof by sublimation. To insure such deposition, the exterior surface of member 12 is maintained at a suitable temperature, approximately 1500° C. being found proper in the case of carbon or graphite. An inert gas, such as helium, may be passed through or into the interior of the porous material to prevent the formation of extraneous compounds, such as acetylene, in the instance when graphite or carbon is being sealed. A carburizing gas, such as methane, may be circulated through or over the heated graphite in such a manner that the pressure on one side thereof is higher than on the other side. The carburizing gas will then convey the carbon vapor through the pores of the graphite to progressively seal the same. This process may automatically terminate when the material is so sealed that the pressure in the interior, or one side thereof, rises to a predetermined value.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A process of sealing the pores in a carbon body, comprising heating one surface of said body to a temperature close to the vaporization temperature of said carbon while maintaining an inert atmosphere around said body whereby part of the carbon on said surface thus heated vaporizes; simultaneously maintaining the surface of said body opposite said heated surface at a temperature of approximately 1500° C. whereby the vaporized carbon condenses and deposits on said opposite surface and in the pores.

2. The process of claim 1 wherein said temperature for vaporization is approximately 3000° C.

References Cited in the file of this patent
UNITED STATES PATENTS

| | | |
|---|---|---|
| 248,427 | Edison | Oct. 18, 1881 |
| 269,239 | Slattery | Dec. 19, 1882 |
| 306,980 | Weston | Oct. 21, 1884 |
| 785,195 | Busch | Mar. 21, 1905 |
| 805,783 | Dorian | Nov. 28, 1905 |
| 916,905 | Whitney | Mar. 30, 1909 |
| 1,470,300 | Szarvasy | Oct. 9, 1923 |
| 2,083,196 | Liebmann | June 8, 1937 |
| 2,265,522 | Farkas | Dec. 9, 1941 |
| 2,282,235 | Moberly | May 5, 1942 |
| 2,392,682 | Marek | Jan. 8, 1946 |

FOREIGN PATENTS

| | | |
|---|---|---|
| 4,776 | Great Britain | 1915 |
| 13,021 | Great Britain | 1911 |
| 18,487 | Great Britain | 1906 |

OTHER REFERENCES

Rogers: "Manual of Industrial Chemistry," fourth edition, vol. I, Van Nostrand (1925).